United States Patent
Van Renesse et al.

[19]

[11] Patent Number: 6,134,244
[45] Date of Patent: Oct. 17, 2000

[54] METHOD AND SYSTEM FOR OPTIMIZING LAYERED COMMUNICATION PROTOCOLS

[76] Inventors: Robert Van Renesse, 100 Franklin St.; Mark Hayden, 111 N. Quarry St., both of Ithaca, N.Y. 14850

[21] Appl. No.: 09/143,620

[22] Filed: Aug. 28, 1998

Related U.S. Application Data

[60] Provisional application No. 60/057,602, Aug. 30, 1997.

[51] Int. Cl.[7] .................................. H04J 3/16; H04J 3/02
[52] U.S. Cl. ........................ 370/469; 370/465; 370/462
[58] Field of Search ................................. 370/469, 462, 370/449, 397, 465; 709/220, 230, 100, 106, 300, 228

[56] References Cited

U.S. PATENT DOCUMENTS

| | | | |
|---|---|---|---|
| 4,914,653 | 4/1990 | Bishop et al. | 370/462 |
| 5,793,767 | 8/1998 | Soda et al. | 370/397 |
| 5,809,253 | 9/1998 | Gallagher et al. | 709/228 |
| 5,818,845 | 10/1998 | Moura et al. | 370/449 |

*Primary Examiner*—Chi H. Pham
*Assistant Examiner*—Brenda H. Pham
*Attorney, Agent, or Firm*—Hodgson, Russ, Andrews, Woods & Goodyear LLP

[57] ABSTRACT

Layering of protocols offers several well-known advantages, such as, for example, reduction of a network design complexity, but, on the other hand, layering introduces overhead which increases delays in communication and typically leads to performance inefficiencies. The present invention provides a number of techniques allowing to model protocol layering and detect where performance inefficiencies occur in the stack of protocol layers. Furthermore, after common execution paths are identified in the protocol stacks, these paths are optimized by using optimization techniques, such as optimizing the computation, compressing protocol headers, and delaying processing. All of the optimizations are automated in a compiler with the help of minor annotations by the protocol designer.

1 Claim, 3 Drawing Sheets

| protocol suite | code latency | delayed opreations |
|---|---|---|
| normal | 1500μs | none |
| trace/ML | 41μs | 28-63μs |
| trace/C | 26μs | 37μs |

METHOD AND SYSTEM FOR OPTIMIZING LAYERED COMMUNICATION PROTOCOLS

CROSS-REFERENCE TO A RELATED APPLICATION

This application claims priority on earlier filed provisional patent application Serial No. 60/057,602, filed Aug. 30, 1997, which is incorporated herein by reference.

FIELD OF THE INVENTION

The present invention relates to transmitting data over digital networks, and, in particular, to decreasing actual computation and layering overhead in addition to improving latency and increasing throughput by reducing overhead caused by interfaces and headers in different protocol layers.

BACKGROUND ART

Distributed systems employ communication protocols for reliable file transfer, window clients and servers, RPC atomic transactions, multi-media communication, etc. Layering of protocols has been known as a way of dealing with the complexity of computer communication. Layered protocols offer such significant advantages as developing and testing high-level protocols broken into small layers more rapidly that large monolithic non-layered protocols. Layered protocols are modular and can often be combined in various ways, allowing the application designer to add or remove layers depending on the properties required. In many layered systems where different protocols are substitutable for one another, application designers can select a combination of protocols most suited to their expected work load. In addition, systems such as Ensemble support changing protocol stacks underneath executing applications, so the application can tune its protocol stack to its changing work load.

Unfortunately, the convenience of having a stack of protocols is often overshadowed by the problem that layering produces a lot of overhead which, in turn, increases delays in communication. Extensively layered group communication systems where high-level protocols are often implemented by 10 or more protocol layers greatly reduce design complexity of a communication network. On the other hand, extensive layering often leads to serious performance inefficiencies.

The disadvantages of layered systems leading to performance inefficiencies consist primarily of overhead, both in computation and in message headers, caused by the abstraction barriers between layers. Because a message often have to pass through as many as 10 or more protocol layers on its way from a host to the network and from the network to a host, the overhead produced by the boundaries between the layers is often more than the actual computation being done. Different system have reported overheads for crossing layers of up to 50 $\mu$s. Therefore, it is highly desirable to mitigate the disadvantages and to develop techniques that reduce delays by improving performance of layered protocols.

Several methods have been suggested to improve performance of layered communication protocols. One of the methods is described by Robbert van Renesse in the article "Masking the Overhead of Protocol Layering", Proc. of the Proceedings of the 1996 ACM SIGCOMM Conference, September 1996, which article is incorporated herein by reference. In that article protocols are optimized through the use of a protocol accelerator which employs, among others, such optimization techniques as pre- and processing of a message in order to move computation overhead out of the common path of execution. The use of that method led to the successful reduction of communication latency, but not the computation. Pre- and post-processing was done through a layering model where handlers were broken into the operations to be done during and after messaging operations (preprocessing for the next message is appended to the post-processing of the current message). The protocol accelerator also used small connection identifiers in order to compress headers from messages and message packing techniques in order to achieve higher throughput. The use of protocol accelerator achieved code latencies of 50 $\mu$s for protocol stacks of 5 layers. The total time required for pre- and post processing of one message during send and receive operations is approximately 170 $\mu$s, with a header overhead of 16 bytes. This result is an improvement in comparison to code-latencies of 26 $\mu$s in Ensemble, protocol headers of 8 bytes, and total processing overhead for a receive operation followed by a send operation of 63 $\mu$s, with a protocol stack that has more than twice as many layers.

The described protocol accelerator optimization model successfully reduces communication latency, but does not decrease actual computation and layering overhead. It would also be desirable to optimize a larger class of communication protocols, including outing and total ordering protocols. Moreover, the protocol accelerator approach requires structural modifications to protocols that are effectively annotations. It would be desirable to employ such optimization that calls for significantly less annotation.

Other work on protocol optimization has been done on Integrated Layer Processing (ILP) in "Analysis of Techniques to Improve Protocol Processing latency; in *Proc. of the Proceedings of the 1996 ACM SIGCOMM Conference,* Stanford, September 1996," and "RPC in the x-Kernel: Evaluating New Design Techniques; In *Proc. of the Fourteenth ACM SYMP. on Operating Systems Principles,* pages 91–101, Asheville, N.C., December 1993. ILP encompasses optimizations on multiple protocol layers. Much of the ILP tends to focus on integrating data manipulations across protocol layers, but not on optimizing control operations and message header compression. On the other hand, ILP advantageously compiles iteration in checksums, presentation formatting, and encryption from multiple protocol layers into a single loop to minimize memory references. Currently, none of the Ensemble protocols touch the application portion of messages. It would be desirable to provide improved optimization techniques incorporating the advantages of already developed optimizations and focusing on such aspects of protocol execution that are compatible with and orthogonal to the existing optimization methods.

The above-described disadvantages of the previously developed optimization methods make it desirable to develop compilation techniques which make layered protocols execute as fast as non-layered protocols without giving up the advantages of using modular, layered protocol suites.

SUMMARY OF THE INVENTION

It is therefore an object of the present invention to provide a system and method which decreases actual computation and layering overhead in addition to latency and to provide optimization techniques applicable to a larger class of protocols.

It is another object of the present invention to achieve optimization of performance of layered protocols by selecting a "basic unit of optimization." To achieve optimization, the method automatically extracts a small number of common sequences of operations occurring in protocol stacks.

These common sequences are called "event traces". The invention provides a facility for substituting optimized versions of these traces at runtime to improve performance. These traces are amenable to a variety of optimizations that dramatically improve performance. The traces can be mechanically extracted from protocol stacks. Event traces are viewed as orthogonal to protocol layers. Protocol layers are the unit of development in a communication system, they implement functionality related to a single protocol. Event traces, on the other hand, are the unit of execution. Therefore, the present invention focuses on event traces to optimize execution.

It is yet another object of the present invention to provide optimized protocols of high performance which are easy to use. Normally, the protocol optimizations are made after-the-fact to already working protocols. This means that protocols are designed largely without optimization issues in mind. In the present invention optimizations require almost no additional programming, only a minimal amount of annotation of the protocol layers is necessary (the annotation consists of marking the start and end of the common paths of the source code). Therefore, optimizations can call for annotating only small portions of the protocols which belong to the common path, reducing the complexity of the optimization techniques. In addition, the optimizations of the present invention place few limitations on the execution model of the protocol layers.

It is also an object of the present invention to be able to apply the current state of verification technology to small, layered protocols which are just within the range of current verification technologies, whereas large, monolithic protocols are certainly outside this range.

BRIEF DESCRIPTION OF THE DRAWING FIGURES

DETAILED DESCRIPTION OF THE PREFERRED EMBODIMENT

I. Layering Model

Figure 1:
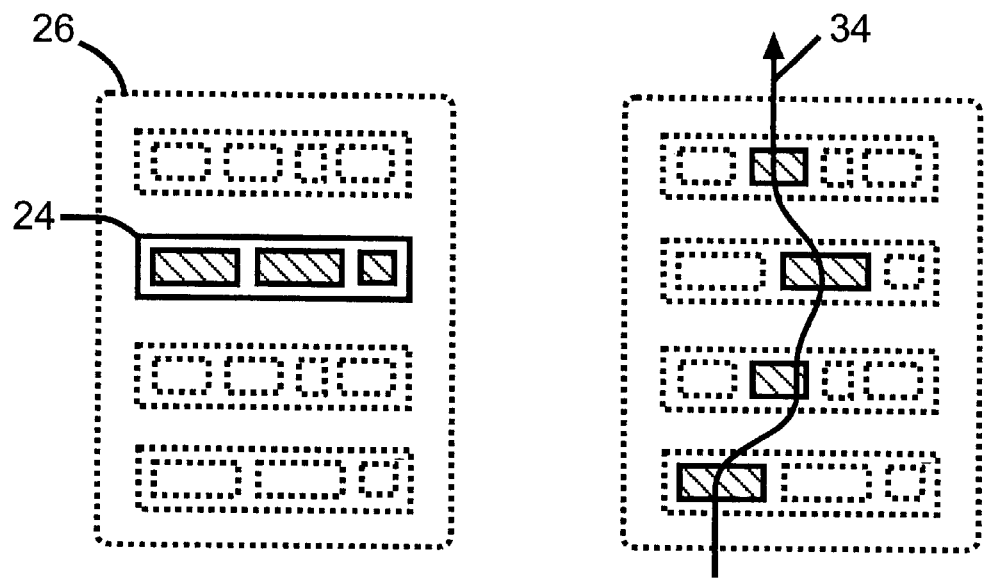
FIG. 1 is a schematic comparison of protocol layers and event traces.
Figure 2:
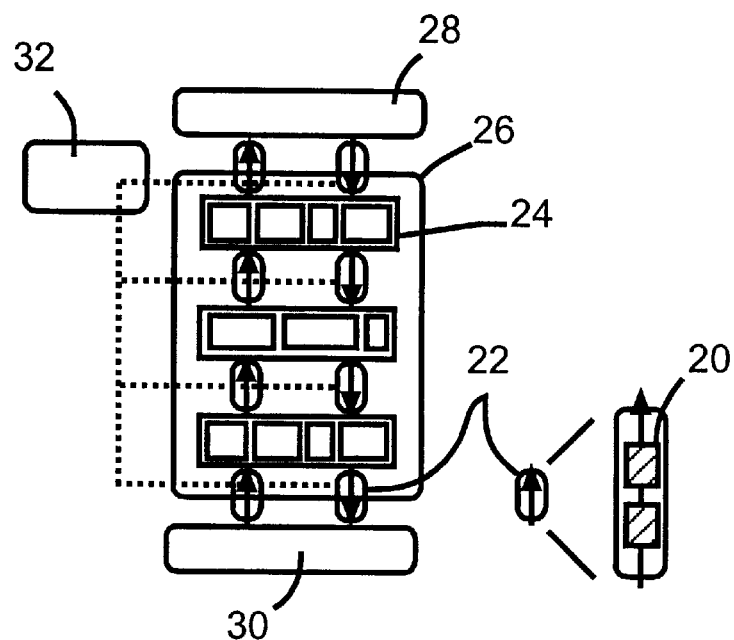
FIG. 2 is a block diagram illustrating elements of a layering model.

The present invention relies on a model of protocol layering, the design of which is central to the presented optimizations. The layering model, illustrated in FIGS. 1–3, comprises the following components:

1. An event 20. Events are records used by protocol layers to pass information about messages. Most events contain a reference to a message, though not all do so.
2. An event queue 22 comprises events that are passed between layers. Events placed in one end of an event queue are removed from the other end in the first-in-first-out order.
3. A Protocol layer 24 implements a small protocol as an event driven automaton. An instance of a protocol layer consists of a (i) local state record and (ii) handlers for processing events passed to it from adjacent layers. A layer interacts with its environment only through the event queues connecting it to adjacent protocol layers. For example, layers do not make any system calls or access any global data structures (other than memory management data structures).
4. A Protocol stack 26 comprises protocol layers which are composed to create protocol stacks. A protocol stack is typically visualized as linear vertical stacks of protocols. Adjacent protocol layers communicate through two event queues, one for passing events from the upper layer to the lower layer, and another for the other direction.
5. An Application 28 and a Network 30. The application communicates with the top of the protocol stack: messages are sent by introducing send events into the top of the stack, and are received by through receive events that are emitted from the top. The network communicates with the bottom of the protocol stack. Send events that emerge from the bottom layer of the protocol stack cause a message to be transmitted over the underlying network. Receive events cause the messages to be inserted into the bottom of the stack of the destination.
6. A Scheduler 32 determines the order of execution of events in a protocol stack. The scheduler must ensure that events are passed between adjacent layers in the first-in-first-out order and that any particular protocol layer is executing at most one event at a time. Also, all events must eventually be scheduled.
7. An Event trace 34 is a sequence of operations in a protocols stack. In particular, the term "event trace" is used to refer to the traces that arise in the normal case. Event trace 34 begins with the introduction of single event into protocol stack 26. The trace continues through the protocol layers, where other events may be spawned either up or down. In many cases even trace 34 may be scheduled in various ways. It is assumed that a particular schedule is chosen for a particular trace.
8. A trace condition 40 is a condition under which a particular event trace will be executed. The condition usually consists of a predicate on the local states of the layers in a protocol stack and on an event about to be introduced to the protocol stack. If the predicate is true then the layers will execute the corresponding trace as a result of the event.
9. A Trace handler 36 comprises the sequence of operations executed in a particular event trace. If the trace condition holds for trace handler 36 then executing the handler will be equivalent to executing the operations along the common path within the protocol layers.
10. Complex event traces are nonlinear with event traces at 34. Many protocol stacks have event traces that are not linear. Nonlinear traces have multiple events that are passed in both directions through the protocol stack. Nonlinear event traces are important, because they occur in many protocol stacks, so without support for such traces these stacks could not be optimized. Examples of such protocols include token-based total ordering protocols, broadcast stability detection protocols, and hierarchical broadcast protocols.

In a simple case of sending a message from a sending host to a destination host, application 28 inserts a send event into the top of protocol stack 26. The event is passed to the topmost protocol layer, such as layer 24 in FIG. 2, which executes its handler on the event. The layer then updates its state and emits zero or more events. In a simple scenario, the same event gets passed from one layer to the next all the way to the bottom of the protocol stack. When the event emerges from the stack, network 30 transmits the message. The destination host inserts a receive event into the bottom of the protocol stack. Again, in a simple scenario the event is repeatedly passed up to the top of the protocol stack and is handed to the application. In more complex situations, a layer can generate multiple events when it processes an event. For instance, a reliable communication layer may both pass a receive event it receives to the layer above it, and pass an acknowledgment event to the layer below.

This model is flexible in that scheduler 32 has few restrictions on the scheduling. For example, the model admits a concurrent scheduler where individual layers execute events in parallel.

The optimizations of the present invention were implemented as a part of the Ensemble communication system, which is described below. For an application builder, Ensemble provides a library of protocols that can be used for quickly building complex distributed applications. An application registers 10 or so event handlers with Ensemble, and then the Ensemble protocols handle the details of reliably sending and receiving messages, transferring state, detecting failures, and managing reconfigurations in the system. For a distributed systems user, Ensemble is a highly modular and reconfigurable toolkit. The high-level protocols provided to applications comprise stacks of small protocol layers. Each of these protocol layers implements several simple properties: providing sets of high-level properties such as, for example, total ordering, security and virtual synchrony. Individual protocol layers can be modified or rebuilt to test with new properties or change the performance characteristics of the system, thus making Ensemble a very flexible platform for developing and testing optimizations to layered protocols.

Figure 3:
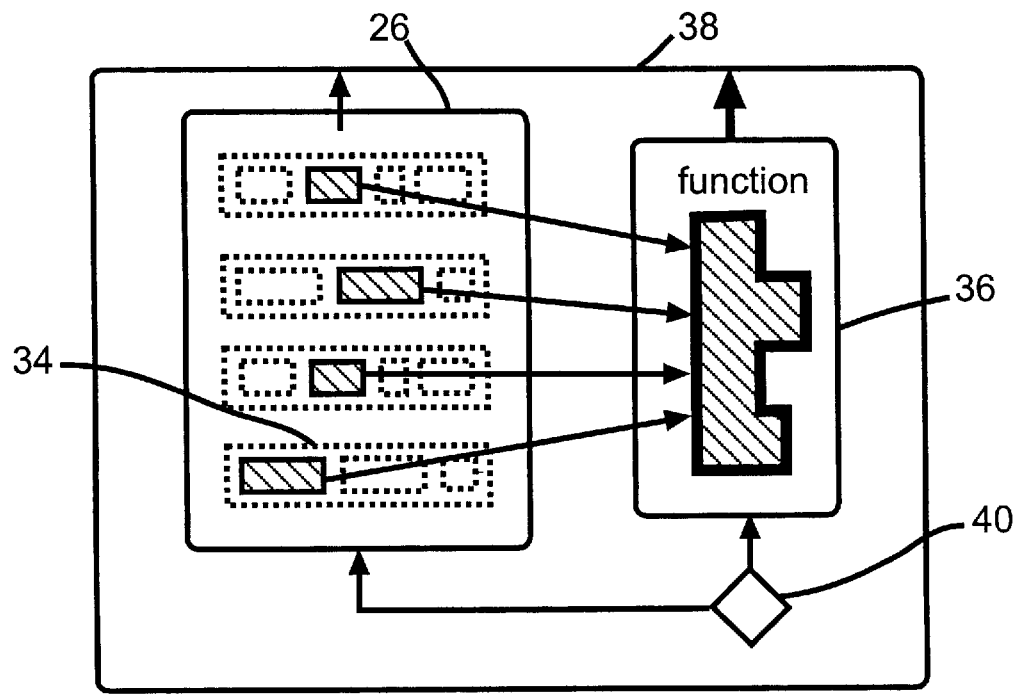
FIG. 3 is a block diagram illustrating event traces, trace handlers, and trace conditions.

As illustrated in FIG. 3, original protocol stack 26 is embedded in an optimized protocol stack 38 in which the events that satisfy trace conditions 40 are intercepted and execute through heavily optimized trace handlers 36. Pictured in FIG. 3 is the original execution of the event trace and the interception of that trace with a trace handler. Multiple traces are optimized with each trace having its own trace condition and handler. In addition the present invention contemplates traces starting both at the bottom and the top of the protocol stack.

II. Common Paths in Layered Systems

Common execution paths of events passed between the protocol layers in a communication system is the first step in the optimization method of the present invention. The old adage, "90% of the time is spent in 10% of a program," says that most programs have common paths, even though it is often not easy to find the common path. However, carefully designed systems often do a good job in exposing this path. In layered communication systems, the designer is often able to easily identify the common execution path for individual protocols, so these common paths can be composed together to arrive at global sequences of operations. It is these sequences, or event traces, that serve as the basic unit of execution and optimization. For each event trace, a condition which must hold for the trace to be enabled is identified, together with a handler that executes all of the operations in the trace.

As an example, a type of event trace that occurs in many protocol stacks is considered. When there are no abnormalities in the system, sending a message through a protocol stack often involves passing a send event directly through the protocol stack from one layer to the next. If messages are delivered reliably and in correct order by the underlying transport, then the actions at the receiving side involve a receive event filtering directly up from the network, through the layers, to the application. Such an event trace is depicted in FIG. 3 at 34. Both the send and receive event traces are called linear traces because (1) they involve only single events, and (2) they move in a single direction either from network 30 to application 28 or vice versa through the protocol stacks.

Figure 4:
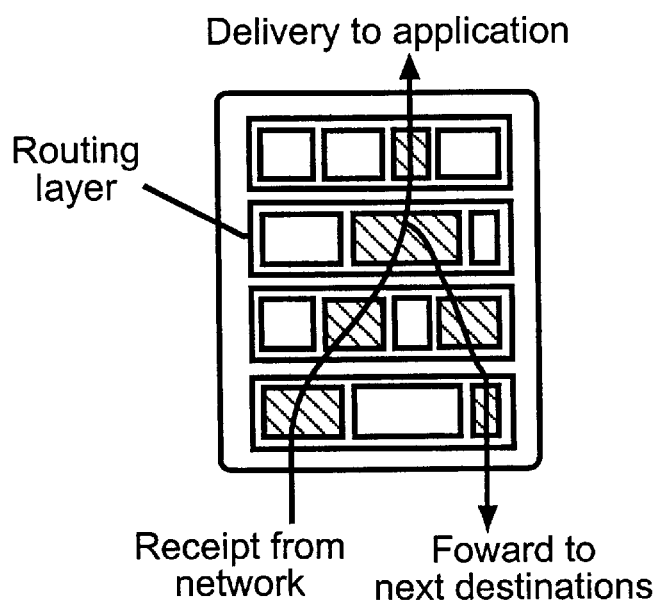
FIG. 4 is a block diagram illustrating a complex, nonlinear trace in a routing protocol stack.

For example, a hierarchical routing protocol is a protocol in which a broadcast to many destinations is implemented through a spanning tree of the destinations. As illustrated in FIG. 4, a message is received from the network and passed to the routing layer. The routing layer forwards a copy down to the next destination and passes a copy to the network. The initiator sends the message to its neighbors in the tree, who then forward it to their children, and so on until it gets to the leaves of the tree which do not forward the message. Some of the traces in a hierarchical routing protocol would include the following steps, the first two of which are linear and the last step is non-linear:

1. Sending a message is a linear trace down through the protocol stack.
2. If a receiver is a leaf of the routing tree, then the receipt is a linear trace up through the stack.
3. If a receiver is not a leaf of the tree, the receipt will be a trace where: (1) the receive event is passed up to the routing protocol, (2) the receive event continues up to the application, and (3) another send event is passed down from the routing protocol to pass the message onto the children at the next level of the tree, as shown in FIG. 4.

Determining and composing event traces is a procedure well suited for optimization. Determining event traces requires some annotation by protocol designers. They must identify the normal cases in the protocol layers, mark the conditions that must hold, and the protocol operations that are executed. Then the traces can be generated by composing the common cases across multiple layers. Note that entire layers are not being annotated and no additional code is being written: the annotation is done only for the common cases, which are usually a small portion of a protocol layer.

Intercepting event traces is an optimization technique which is used after the event traces of a protocol stack have been ascertained. After such time it becomes possible to build alternative versions of the code executed during those traces and modify the system so that before an event is introduced into a protocol stack, the system checks whether one of the event conditions is enabled. If the event condition is not enabled, then the event is executed in the protocol stack in the normal fashion, and checking the conditions has slowed the protocol down a little. If a trace condition holds, then the normal event execution is intercepted and instead the trace handler is executed. The performance improvement then depends on the percentage of events for which the trace condition is enabled, the overhead of checking the conditions, and how much faster the trace handler is.

The use of a trace handler assumes that there are no events pending in any of the intervening event queues. If there were a pending event, the trace handler would violate the model because the events in the trace would be executed out of order with regard to the previously queued event. The solution to this problem relies on the flexibility of the layering model, and works by using a special event scheduler that executes all pending events to completion before attempting to bypass a protocol stack, ensuring that there are no intervening events.

The transformation of the protocol stack maintains correctness of the protocols because trace handlers execute exactly the same operations as could occur in the normal operation of the protocol layers, ensuring, therefore, the soundness of the transformation. If the original protocols are correct, then the trace protocols are correct as well.

III. Optimizing Event Traces

After event traces are determined and common paths of execution based on the event traces are identified the event traces are then optimized. The optimization techniques are divided into three classes: the first class of the techniques improve the speed of the computation; the second class compresses the size of message headers; and the third class reorders operations to improve communication latency without affecting the amount of computation.

A. Optimizing Computation

The first class of optimizations comprises optimization that improve the performance of the computation in event handlers. The general approach used by each optimizations is to carry out a set of transformations to the protocol stack so that traditional compilation techniques can be effectively applied.

The first step in optimizing computation extracts the source code corresponding to the trace condition and trace handler from the protocol layers. At this step it is convenient to break the operations of a stack into two types: protocol and layering operations. Protocol operations are those that are directly related to implementing a protocol, including operations such as message manipulations and state updates. Layering operations are those that result from the use of layered protocols, including but not limited to the costs of scheduling the event queues and the function call overhead from all the layers' event handlers. Layering operations are not strictly necessary because they are not parts of the protocols. Given an event trace and annotated protocol layers, annotations are used to textually extract the protocol operations for the trace from each layer.

The second pass is used to eliminate intermediate data structures. The second step removes the explicit use of events in the protocol layers. In the described layering model, event records are used to pass information between protocol layers in a stack. These records contain temporary information about a message, which information follows the message through the layers and event queues. Each event must be allocated, initialized, and later released. It is not necessary to use events explicitly, because event traces encompass the life of the initial event and all spawned events. Therefore, the contents of the event record can instead be kept in local variables within the trace handler. Compilers are often able to place such variables in registers.

The third step is employed to completely inline all functions called from the trace handler. The payoff for inlining is quite large because the trace handlers form almost all of the execution profile of the system. Normally, code explosion is an important concern when inlining functions. However, the code explosion is not an issue in this case, because there is only a small number of trace handlers which are normally not too large: the inlining is focussed on a small part of the system so the code explosion will not be large. Additionally, the functions called from trace handlers are normally simple operations on abstract data types, such as adding or removing messages from buffers. These functions are not recursive and do not call many other nested functions, so fully inlining them will typically add only a fixed amount of code.

The fourth step is to apply traditional optimizations to the trace handlers. This operation proves to be very effective, because the previous passes create large basic blocks which compilers can optimize. Furthermore eliminating constant folding and dead-code also proved to be effective due to the elimination of event records. For instance, if one protocol layer marks an event record's field with some flag to cause an operation to happen at another layer, the flap can be propagated through the trace handler so that the flag is never set at the first layer or checked at the second layer.

B. Compressing Protocol Headers

The second class of optimizations provided by the present invention reduces the size of message headers. The protocols layers in a stack prepend their headers to a message as it moves up or down the protocol stack. Later the message headers stripped off by popped off by the peer layers at the destination host. To facilitate optimization these headers are divided into three classes, two of which are suitable for compression.

1. Addressing headers are the headers used for routing messages, including addresses and other identifiers. They are treated opaquely: i.e., protocols are only interested in testing these headers for equality. Such headers are compressed through so-called path or connection identifiers, as described below.

2. Constant headers include headers that are one of several enumerated constant values and specify the "type" of the message. For instance, a reliable transmission protocol may mark messages as being "data" or "acknowledgments" with a constant header, and from this making the receiver knows how to treat the message. These headers are compressed by our approach when they appear in the common path.

3. Non-constant headers include any other headers, such as sequence numbers or headers used in negotiating reconfigurations. The non-constant headers are not compressed.

The above-described header compression optimizations are based on the use of connection identifiers, such as the ones described in U.S. patent application Ser. No. 09/094, 204, which is incorporated herein by reference. Connection identifiers are tuples containing addressing headers which do not change very often. All the information in these tuples are hashed into 32-bit values which are then used along with hash tables to route messages to the protocol stacks. MD5 (a cryptographic one way hash function) is used to make hashing collisions very unlikely and other well-known techniques can be used to protect against collisions when they occur. The use of connection identifiers compresses many addressing headers into a single small value. As a result, all subsequent messages benefit from such compression. Although the main goal of header compression is to improve bandwidth efficiency, small headers also contribute to improved performance in transmitting the messages on the underlying network and in the protocols themselves because less data is being moved around.

In the present invention the concept of connection identifiers is extended to contain an additional field called the "multiplexing index." This field is used to multiplex several virtual channels over a single channel. Such use of connection identifiers allows constant headers to be compressed along with addressing headers. The compression is done by statically determining the constant headers that are used in a trace handler and creating a virtual channel for that trace handler to send messages on. The constant headers are embedded in the code for the receiving trace handler.

The header compression optimization significantly reduces the header overhead of the protocol layers. Even though each of the constant headers is quite small, the costs involved in pushing and popping them becomes significant in large protocol stacks. In addition, by encoding these constant values in the trace code, standard compiler optimizations, such as constant folding and dead code elimination, are possible. For example, protocols in Ensemble have been successfully optimized using header compression. In many protocol stacks (including the ones with more than 10 protocol layers), traces often contain only one field. Without trace optimizations the headers with only one variable field add up to 50 bytes. With compression the total header size decreases to 8 bytes. 4 bytes of these 8 comprise a connection identifier. The other 4 bytes is a sequence number. Evidently, the compressed 8 byte header creates much less overhead in comparison with the headers in similar communication protocols, such as TCP (40 bytes or 20 bytes for TCP with header compression) Isis (over 80 bytes), and Horus (over 50 bytes).

Managing multiple formats is another task that can be optimized. Two related problems arise when additional header formats are introduced to protocol stacks which expect only a single format. The first problem occurs when a trace condition is not enabled for a message received with compressed headers (for example, out-of-order messages may not be supported by trace handlers). Such a message must be passed to the normal execution of the protocol even though the message is not in the normal format. The second problem arises when a trace handler inserts a message into a buffer and a protocol layer later accesses the message. The solution to both problem lies in reformatting such messages. The messages are reformatted by functions which regenerate constant fields and move variable fields to their normal location in the messages. These reformatting functions can be generated automatically. To solve the first problem, the message is reformatted before being passed to the normal protocol stack. The protocol layers get the message as though it were delivered in the standard format.

In order to manage buffers containing messages in different formats, each message is marked as normal or compressed. Compressed messages are buffered along with their reformatting function. When a protocol accesses a compressed message, it first calls the function to reformat the message. For most protocols, normally a message is buffered and later released without further accesses by protocols. Reformatting is efficient in these cases, because messages are buffered in compressed form and, so no additional operations are carried out on the message. Handling the buffers requires some modification of the protocol layers. The modification is required only in the layers with message buffers, and in such layers the modification is usually very simple. The reformatting function needs to be stored with compressed messages, but the cost of storage is offset by the decreased size of the messages.

C. Delayed Processing

The third class of optimizations serves to improve latency of the trace handlers without decreasing the amount of computation. When a message is sent, there are certain operations (such as determining a message's sequence number) which must be executed before the message is transmitted, whereas some operations may be delayed until after the transmission (such as buffering the message). The effect of reordering operations is to decrease the communication latency. Similarly, some operations executed at the receiving cost delayed until after the message is delivered.

Protocols are annotated to specify which operations can or cannot be delayed.

IV. Use of the ML Programming Language

The above-described optimization techniques were tested on the Ensemble system which is implemented entirely in the ML programming language. Ensemble is derived from a previous system written in C Horus, embodying numerous Horus features. The use of ML in Ensemble allowed to make all the structural changes that have improved performance. The optimizations provided by the present invention, Ensemble is much faster than Horus, even though C programs generally execute faster than ML programs. Ensemble benefits from a design which has tremendously improved performance, and the use of ML has been essential in being able to rapidly experiment and refine Ensemble's architecture in order to make these optimizations.

V. Implementation of the Optimizations

An example of the kinds of applications in which Ensemble is used is a highly available remote process management service. This service uses groups of daemons to manage and migrate remote processes. The Ensemble protocols support reliable, totally ordered communication between the daemons for coordinating distributed operations, and the protocols manage system reconfigurations resulting from machine failures.

Figures 5, 6:
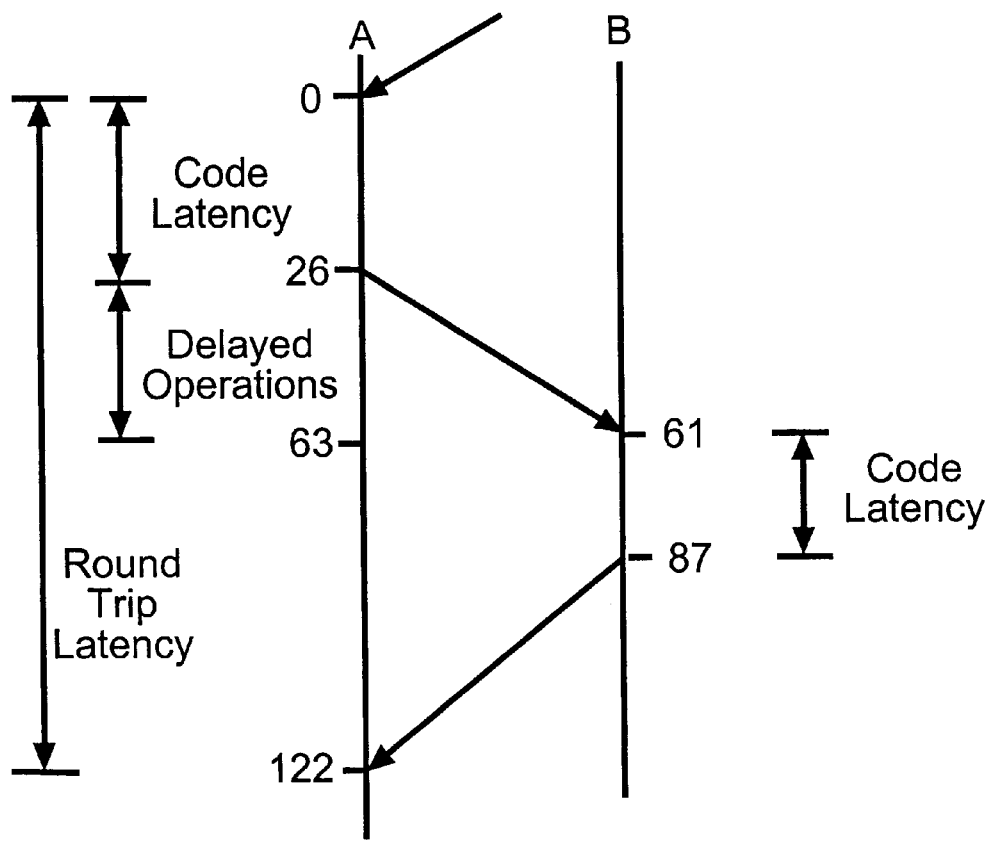
FIG. 5 is a chart representing performance comparison for various protocol stacks.
FIG. 6 is an illustration of a round-trip latency time line between two processes.

The optimized protocols tested in Ensemble implemented the first-in-first-out virtual synchrony and consisted of 10 or more protocol layers. The first-in-first-out virtual synchrony is described in the article "Exploiting virtual Synchrony in Distributed systems," *In Proc. of the Eleventh ACM Symp. on Operating Systems Principles,* pages 123–138, Austin Tex., November 1987, which is incorporated herein by reference. All the performance measurements were made on groups with 2 members, where the properties are roughly equivalent to those of TCP. Actual communication was over point-to-point (UDP or ATM) or multicast (IP Multicast) transports which provide best-effort delivery and a checksum facility. With regard to the overhead introduced by our protocols, the measurements were taken only of the code-latency of our protocols with the latencies of the underlying transports subtracted out. Two measurements were particularly important for evaluating the performance of optimized protocols. The first one is the time between receiving a message from the network and sending another message on the network. This time is called the protocol code-latency. The second measurement is the time necessary to complete the delayed operations after one receive and one send operation. The second measurement corresponds to the amount of computation that is removed from the common path by delaying operations. All measurements were made on Sparcstation 20s with 4 byte messages. Measurements were gathered for three protocol stacks: the non-optimized protocols, the optimized protocols entirely in ML, and the optimized protocols where the trace conditions and handlers have been rewritten in C. As shown in FIG. 5, the C version of the protocol stacks has approximately 5 $\mu$s of overhead in the code-latency from parts of the Ensemble infrastructure that are in ML. This result can be further optimized by rewriting this infrastructure in C. There are no delayed operations in the non-optimized protocol stack.

The time line for the latency corresponding to one round-trip of the C protocol is depicted in FIG. 6. In this test two Sparcstation 20s are communicating over an ATM network using U-net which has one-way latencies of 35 $\mu$s. As shown in FIG. 6, at 0 $\mu$s process A received a message from process B off the network. 26 $\mu$s later the application received the message and the next message was sent on the network. At 61 $\mu$s, process B received the message and sent the next message at 87 $\mu$s. Process A completed its delayed updates by time 62 $\mu$s. The total round-trip time was 122 $\mu$s, of which Ensemble contributed 52 $\mu$s.

It is important to note that since the time the test results represented in FIG. 5 were obtained, significance improvements in ML compilers made it possible to achieve the performance of the optimized pure ML protocol stack similar to that of the C protocol.

It is therefore apparent that the present invention accomplishes its intended objects. While embodiments of the present invention have been described in detail, that is for the purpose of illustration, not limitation.

What is claimed is:

1. A method of improving performance efficiency in a communication system having a plurality of layered protocols by decreasing actual computation, communication latency and layering overhead, the method comprising the steps of:

determining at least one common execution path in the communication system by identifying a common sequence of operations occurring in the plurality of layered protocols and identifying at least one condition allowing an event to be executed along the common execution path; and optimizing the speed of execution of the event along the common execution path by extracting the source code corresponding to the condition and the common sequence of operations, eliminating intermediate data structures and inlining functions called from the common sequence of operations.

* * * * *

UNITED STATES PATENT AND TRADEMARK OFFICE
CERTIFICATE OF CORRECTION

PATENT NO. : 6,134,244
DATED : October 17, 2000
INVENTOR(S) : Van Renesse et al.

Page 1 of 1

It is certified that error appears in the above-identified patent and that said Letters Patent is hereby corrected as shown below:

Column 1,
Before "FIELD OF THE INVENTION", insert the following paragraph:
-- This invention was made with Government support from the ONR/ARPA under Contract No. N00014-92-J-1866. The Government has certain rights in the invention. --

Signed and Sealed this

Twelfth Day of March, 2002

Attest:

JAMES E. ROGAN
Attesting Officer — Director of the United States Patent and Trademark Office

UNITED STATES PATENT AND TRADEMARK OFFICE
CERTIFICATE OF CORRECTION

PATENT NO.     : 6,134,244
DATED          : October 17, 2000
INVENTOR(S)    : Van Renesse et al.

It is certified that error appears in the above-identified patent and that said Letters Patent is hereby corrected as shown below:

<u>Title page,</u>
Item [76], after "Inventors" change "Robert" to -- Robbert --.

Signed and Sealed this

Twenty-seventh Day of August, 2002

Attest:

JAMES E. ROGAN
Attesting Officer
Director of the United States Patent and Trademark Office